US012562152B2

(12) United States Patent
Weisz et al.

(10) Patent No.: US 12,562,152 B2
(45) Date of Patent: Feb. 24, 2026

(54) VOICE-HISTORY BASED SPEECH BIASING

(71) Applicant: Google LLC, Mountain View, CA (US)

(72) Inventors: Ágoston Weisz, Zurich (CH); Mikhail Dektiarev, Zurich (CH)

(73) Assignee: Google LLC, Mountain View, CA (US)

( * ) Notice: Subject to any disclaimer, the term of this patent is extended or adjusted under 35 U.S.C. 154(b) by 548 days.

(21) Appl. No.: 18/063,118

(22) Filed: Dec. 8, 2022

(65) Prior Publication Data

US 2024/0194188 A1     Jun. 13, 2024

(51) Int. Cl.
 G10L 15/07     (2013.01)
 G10L 15/30     (2013.01)

(52) U.S. Cl.
 CPC .............. G10L 15/07 (2013.01); G10L 15/30 (2013.01)

(58) Field of Classification Search
 CPC ......... G10L 15/07; G10L 15/30; G10L 15/16; G10L 2015/227; G10L 2015/228; G10L 15/197; G10L 15/22; G06F 3/167
 USPC ........................................................ 704/244
 See application file for complete search history.

(56) References Cited

U.S. PATENT DOCUMENTS

| | | | | | |
|---|---|---|---|---|---|
| 5,995,926 | A | * | 11/1999 | Gupta | ............... H04M 3/42204 |
| | | | | | 704/240 |
| 6,415,258 | B1 | * | 7/2002 | Reynar | ................... G06F 3/167 |
| | | | | | 704/E15.04 |
| 6,581,033 | B1 | * | 6/2003 | Reynar | ................... G10L 15/22 |
| | | | | | 704/E15.04 |
| 6,839,669 | B1 | * | 1/2005 | Gould | ..................... G10L 15/22 |
| | | | | | 704/E15.04 |
| 7,149,970 | B1 | * | 12/2006 | Pratley | ................... G10L 15/22 |
| | | | | | 704/E15.04 |
| 8,260,615 | B1 | * | 9/2012 | Nakajima | ............. G10L 15/183 |
| | | | | | 704/2 |
| 8,521,526 | B1 | * | 8/2013 | Lloyd | ................. G06F 16/3344 |
| | | | | | 704/251 |
| 8,566,102 | B1 | * | 10/2013 | Bangalore | ............... G10L 15/22 |
| | | | | | 704/270.1 |

(Continued)

OTHER PUBLICATIONS

International Search Report and Written Opinion issued in related PCT Application No. PCT/US2023/079486, dated Feb. 5, 2024.

*Primary Examiner* — Thuykhanh Le
(74) *Attorney, Agent, or Firm* — Honigman LLP; Brett A. Krueger; Grant Griffith

(57)     ABSTRACT

A method of using voice query history to improve speech recognition includes receiving audio data corresponding to a current query spoken by a user and processing the audio data to generate a lattice of candidate hypotheses. The method also includes obtaining voice query history data associated with the user that includes n-grams extracted from transcriptions of previous queries spoken by the user, and generating, using a biasing context model configured to receive the voice query history data, a biasing context vector. The biasing context vector indicates a likelihood that each n-gram from the n-grams extracted from the transcriptions of the previous queries spoken by the user will appear in the current query. The method also includes augmenting the lattice of candidate hypotheses based on the biasing context vector and determining a transcription for the current query based on the augmented lattice of candidate hypotheses.

20 Claims, 8 Drawing Sheets

(56) References Cited

U.S. PATENT DOCUMENTS

| | | | |
|---|---|---|---|
| 9,043,208 B2* | 5/2015 | Koch | G10L 15/30 |
| | | | 704/251 |
| 9,053,708 B2* | 6/2015 | Koch | G10L 15/1822 |
| 9,576,578 B1* | 2/2017 | Skobeltsyn | G10L 15/22 |
| 9,858,925 B2* | 1/2018 | Gruber | G10L 15/18 |
| 10,176,802 B1* | 1/2019 | Ladhak | G06N 3/0442 |
| 10,388,272 B1* | 8/2019 | Thomson | G10L 15/22 |
| 10,453,117 B1* | 10/2019 | Reavely | G06F 40/295 |
| 10,573,312 B1* | 2/2020 | Thomson | G10L 15/22 |
| 10,713,570 B1* | 7/2020 | Hazard | G06F 21/554 |
| 11,043,214 B1* | 6/2021 | Hedayatnia | G10L 15/22 |
| 11,057,519 B1* | 7/2021 | Miller | H04M 3/5175 |
| 11,081,104 B1* | 8/2021 | Su | G06F 40/216 |
| 11,328,712 B2* | 5/2022 | Ponniah | G10L 15/04 |
| 11,334,712 B1* | 5/2022 | Nadig | G10L 15/22 |
| 11,574,637 B1* | 2/2023 | Kumar | G10L 15/22 |
| 11,681,364 B1* | 6/2023 | Zhang | G06N 3/0455 |
| | | | 345/156 |
| 11,762,052 B1* | 9/2023 | Ganguly | G01S 5/20 |
| | | | 367/124 |
| 12,379,894 B1* | 8/2025 | Raux | G06F 3/167 |
| 2002/0052742 A1* | 5/2002 | Thrasher | G10L 15/26 |
| | | | 704/251 |
| 2002/0156830 A1* | 10/2002 | Gayama | H04L 67/52 |
| | | | 704/E15.044 |
| 2003/0120486 A1* | 6/2003 | Brittan | G10L 15/32 |
| | | | 704/231 |
| 2004/0024601 A1* | 2/2004 | Gopinath | G10L 15/22 |
| | | | 704/E15.04 |
| 2011/0184730 A1* | 7/2011 | LeBeau | G10L 15/30 |
| | | | 704/235 |
| 2011/0288868 A1* | 11/2011 | Lloyd | G10L 15/22 |
| | | | 704/E15.001 |
| 2012/0016671 A1* | 1/2012 | Jaggi | G10L 15/22 |
| | | | 704/235 |
| 2012/0022874 A1* | 1/2012 | Lloyd | G10L 15/19 |
| | | | 704/E21.001 |
| 2013/0041685 A1* | 2/2013 | Yegnanarayanan | G16H 50/20 |
| | | | 705/2 |
| 2013/0268271 A1* | 10/2013 | Osada | G10L 15/065 |
| | | | 704/240 |
| 2013/0311506 A1* | 11/2013 | Taubman | G06F 16/90335 |
| | | | 707/769 |
| 2014/0358533 A1* | 12/2014 | Kurata | G10L 15/08 |
| | | | 704/231 |
| 2014/0372120 A1* | 12/2014 | Harsham | G10L 15/08 |
| | | | 704/251 |
| 2014/0372122 A1* | 12/2014 | Harsham | G06F 3/16 |
| | | | 704/257 |
| 2015/0242386 A1* | 8/2015 | Moreno Mengibar | |
| | | | G06F 40/232 |
| | | | 704/235 |
| 2015/0332673 A1* | 11/2015 | Li | G06F 40/30 |
| | | | 704/235 |
| 2015/0379993 A1* | 12/2015 | Subhojit | G10L 15/065 |
| | | | 704/275 |
| 2016/0365092 A1* | 12/2016 | Moreno Mengibar | |
| | | | G10L 15/197 |
| 2017/0025125 A1* | 1/2017 | Alvarez Guevara | G10L 15/02 |
| 2017/0229124 A1* | 8/2017 | Strohman | G10L 15/32 |
| 2017/0294190 A1* | 10/2017 | Lindle | G10L 15/26 |
| 2018/0046851 A1* | 2/2018 | Kienzle | B60K 35/235 |
| 2018/0233131 A1* | 8/2018 | Aleksic | G10L 15/187 |
| 2018/0233152 A1* | 8/2018 | Olaya | G10L 15/22 |
| 2018/0330723 A1* | 11/2018 | Acero | G10L 15/30 |
| 2019/0013008 A1* | 1/2019 | Kunitake | G10L 15/08 |
| 2019/0066659 A1* | 2/2019 | Imai | G10L 15/063 |
| 2019/0126488 A1* | 5/2019 | Sumiyoshi | G10L 15/22 |
| 2020/0020325 A1* | 1/2020 | Nam | G06F 16/322 |
| 2020/0135187 A1* | 4/2020 | Chao | G10L 15/30 |
| 2020/0160838 A1* | 5/2020 | Lee | G10L 15/183 |
| 2020/0175961 A1* | 6/2020 | Thomson | G10L 15/063 |
| 2020/0243094 A1* | 7/2020 | Thomson | G10L 15/28 |
| 2020/0312312 A1* | 10/2020 | Galustyan | G10L 15/02 |
| 2020/0320988 A1* | 10/2020 | Rastogi | G10L 15/1815 |
| 2020/0342018 A1* | 10/2020 | Lange | G06F 16/215 |
| 2020/0357388 A1 | 11/2020 | Zhao et al. | |
| 2020/0357412 A1* | 11/2020 | Robert Jose | G10L 15/1815 |
| 2021/0012765 A1* | 1/2021 | Weisz | G10L 15/1815 |
| 2021/0035564 A1* | 2/2021 | Ogawa | G06N 5/046 |
| 2021/0104253 A1* | 4/2021 | Jolly | G10L 25/60 |
| 2021/0279427 A1* | 9/2021 | Malik | G10L 25/51 |
| 2022/0004870 A1* | 1/2022 | Wang | G06N 3/048 |
| 2022/0068263 A1* | 3/2022 | Roy | G06F 40/30 |
| 2022/0084505 A1* | 3/2022 | Baharav | G06F 3/167 |
| 2022/0093101 A1* | 3/2022 | Krishnan | G06V 40/20 |
| 2022/0293109 A1* | 9/2022 | Sharifi | G10L 15/32 |
| 2022/0310081 A1* | 9/2022 | Gaur | G10L 15/22 |
| 2022/0392432 A1* | 12/2022 | Alphonso | G10L 15/01 |
| 2022/0399015 A1* | 12/2022 | Klein | G06N 3/045 |
| 2022/0415315 A1* | 12/2022 | Suzuki | G06F 40/279 |
| 2023/0022515 A1* | 1/2023 | Aher | H04N 21/42203 |
| 2023/0050795 A1* | 2/2023 | Moriya | G10L 15/005 |
| 2023/0068798 A1* | 3/2023 | Etchart | G06T 7/74 |
| 2023/0173657 A1* | 6/2023 | Sharifi | G06V 20/50 |
| | | | 701/23 |
| 2023/0186898 A1* | 6/2023 | Weisz | G10L 15/30 |
| | | | 704/257 |
| 2023/0252995 A1* | 8/2023 | Sharifi | G10L 15/08 |
| | | | 704/260 |
| 2023/0335124 A1* | 10/2023 | Velikovich | G10L 15/1815 |
| 2023/0335125 A1* | 10/2023 | Velikovich | G10L 15/197 |
| 2024/0071379 A1* | 2/2024 | Sudo | G10L 15/197 |
| 2024/0185842 A1* | 6/2024 | Assael | G10L 15/16 |
| 2025/0220115 A1* | 7/2025 | Miller | H04M 3/5191 |

* cited by examiner 200,200b

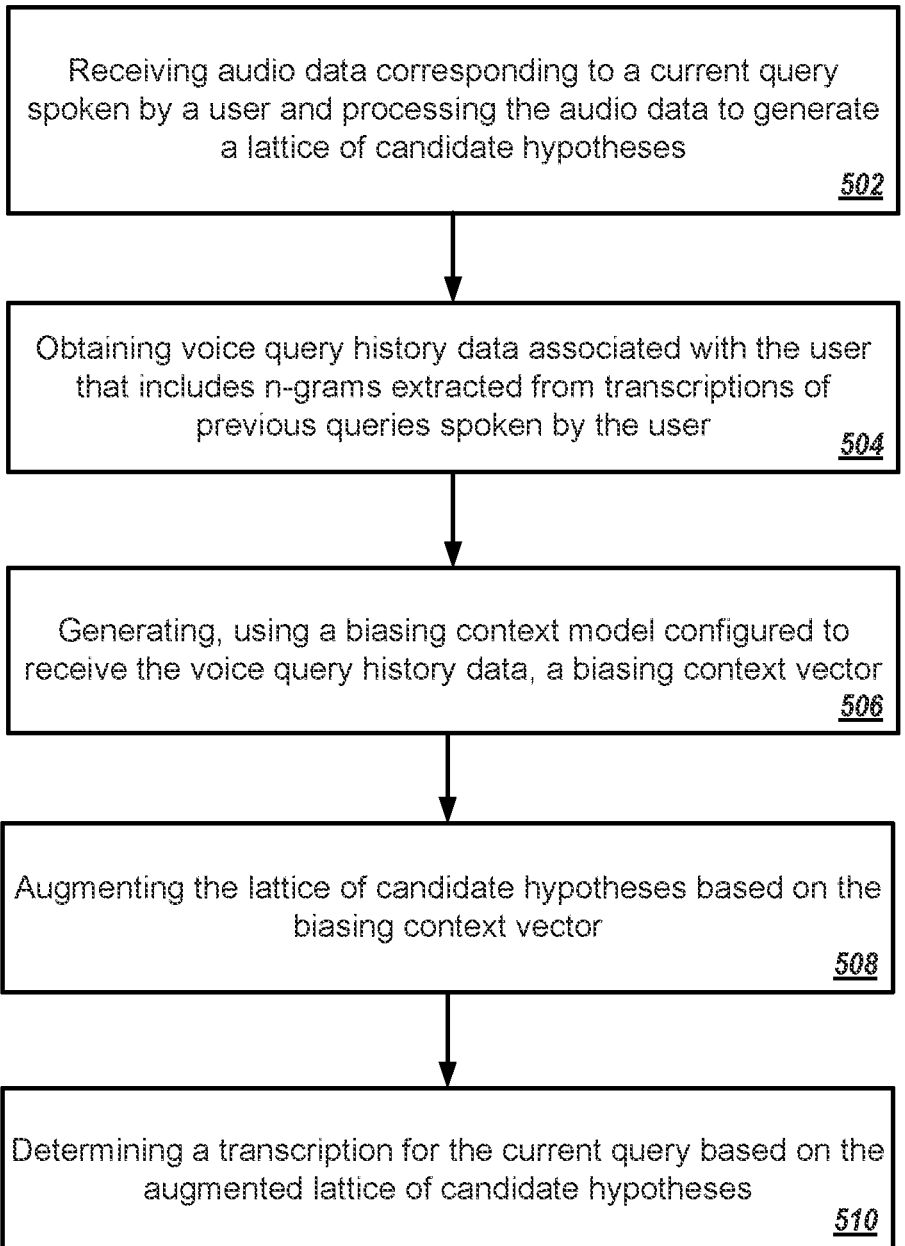

Receiving audio data corresponding to a current query spoken by a user and processing the audio data to generate a lattice of candidate hypotheses

_502_

Obtaining voice query history data associated with the user that includes n-grams extracted from transcriptions of previous queries spoken by the user

_504_

Generating, using a biasing context model configured to receive the voice query history data, a biasing context vector

_506_

Augmenting the lattice of candidate hypotheses based on the biasing context vector

_508_

Determining a transcription for the current query based on the augmented lattice of candidate hypotheses

VOICE-HISTORY BASED SPEECH BIASING

TECHNICAL FIELD

This disclosure relates to voice history-based speech biasing.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. The devices may operate in a sleep state and initiate a wake-up process to perform speech recognition on an utterance directed to the system in response to detecting a hotword spoken by the user that precedes the utterance. User context information, such as a past typed history or other personal information (e.g., contact list, music playlist, etc.), may be used for biasing speech recognition toward words/phrases that a given user is likely to speak

SUMMARY

One aspect of the disclosure provides a computer-implemented method executed on data processing hardware that causes the data processing hardware to perform operations that include receiving audio data corresponding to a current query spoken by a user and processing the audio data to generate a lattice of candidate hypotheses using a speech recognizer. Each candidate hypotheses corresponds to a candidate transcription for the current query and represented by a respective sequence of hypothesized terms. The operations also include obtaining voice query history data associated with the user that includes n-grams extracted from transcriptions of previous queries spoken by the user, and generating, using a biasing context model configured to receive the voice query history data, a biasing context vector. The biasing context vector indicates a likelihood that each n-gram from the n-grams extracted from the transcriptions of the previous queries spoken by the user will appear in the current query. The operations also include augmenting the lattice of candidate hypotheses based on the biasing context vector and determining a transcription for the current query based on the augmented lattice of candidate hypotheses.

Implementations of the disclosure may include one or more of the following optional features. In some implementations, augmenting the lattice of candidate hypotheses includes determining, using the biasing context vector, corresponding likelihood scores for the candidate hypotheses, and determining the transcription for the current query includes ranking the candidate hypotheses based on the corresponding likelihood scores determined for the candidate hypotheses and selecting the highest ranking one of the candidate hypotheses as the transcription of the current query. The n-grams of the voice query history data may include n-grams extracted from only previous queries spoken by the user within a threshold time before the current query.

In some examples, the voice query history data includes user statistics for each corresponding n-gram among the n-grams extracted from the transcriptions of the previous queries spoken by the user associated with the user that spoke the current query. Here, the user statistics for each corresponding n-gram indicates at least one of: a frequency that the corresponding n-gram appears in transcriptions of the previous queries spoken by the user; a frequency that the corresponding n-gram appeared in a successful transcription of the previous queries spoken by the user; or a frequency that the corresponding n-gram appeared in a corrected transcription. In these examples, the user statistics for each corresponding n-gram further include one or more features associated with the transcription of the previous query that included the corresponding n-gram. Here, the one or more features may include a source that captured the previous query, an application the previous query was directed toward, or a time when the previous query was spoken by the user.

In some implementations, the voice query history data further includes n-grams extracted from transcriptions of query histories of a corpus of users. In these implementations, the voice query history data may include global statistics for each corresponding n-gram among the n-grams extracted from the transcriptions of the query histories of the corpus of users. The global statistics for each corresponding n-gram may indicate at least one of: a frequency that the corresponding n-gram appeared in the transcriptions of the previous queries of the corpus of users; a frequency that the corresponding-gram appeared in a successful transcription of the previous queries of the corpus of users; or a frequency that the corresponding n-gram appeared in a corrected transcription.

When generating the biasing context vector, the biasing context model may be further configured to receive contextual features indicating at least one of a source that captured the current query, an application the current query was directed toward, or a time of the current query. In some configurations, the speech recognizer includes an end-to-end speech recognition model. The current query may be captured by a client device associated with the user. The data processing hardware may reside on the user device or a computing system in communication with the client device via a network.

Another aspect of the disclosure provides a system that includes data processing hardware and memory hardware in communication with the data processing hardware. The memory hardware stores instructions that when executed on the data processing hardware causes the data processing hardware to perform operations that include receiving audio data corresponding to a current query spoken by a user and processing the audio data to generate a lattice of candidate hypotheses using a speech recognizer. Each candidate hypotheses corresponds to a candidate transcription for the current query and represented by a respective sequence of hypothesized terms. The operations also include obtaining voice query history data associated with the user that includes n-grams extracted from transcriptions of previous queries spoken by the user, and generating, using a biasing context model configured to receive the voice query history data, a biasing context vector. The biasing context vector indicates a likelihood that each n-gram from the n-grams extracted from the transcriptions of the previous queries spoken by the user will appear in the current query. The operations also include augmenting the lattice of candidate hypotheses based on the biasing context vector and determining a transcription for the current query based on the augmented lattice of candidate hypotheses.

This aspect may include one or more of the following optional features. In some implementations, augmenting the lattice of candidate hypotheses includes determining, using the biasing context vector, corresponding likelihood scores for the candidate hypotheses, and determining the transcription for the current query includes ranking the candidate hypotheses based on the corresponding likelihood scores determined for the candidate hypotheses and selecting the highest ranking one of the candidate hypotheses as the transcription of the current query. The n-grams of the voice query history data may include n-grams extracted from only previous queries spoken by the user within a threshold time before the current query.

In some examples, the voice query history data includes user statistics for each corresponding n-gram among the n-grams extracted from the transcriptions of the previous queries spoken by the user associated with the user that spoke the current query. Here, the user statistics for each corresponding n-gram indicates at least one of: a frequency that the corresponding n-gram appears in transcriptions of the previous queries spoken by the user; a frequency that the corresponding n-gram appeared in a successful transcription of the previous queries spoken by the user; or a frequency that the corresponding n-gram appeared in a corrected transcription. In these examples, the user statistics for each corresponding n-gram further include one or more features associated with the transcription of the previous query that included the corresponding n-gram. Here, the one or more features may include a source that captured the previous query, an application the previous query was directed toward, or a time when the previous query was spoken by the user.

In some implementations, the voice query history data further includes n-grams extracted from transcriptions of query histories of a corpus of users. In these implementations, the voice query history data may include global statistics for each corresponding n-gram among the n-grams extracted from the transcriptions of the query histories of the corpus of users. The global statistics for each corresponding n-gram may indicate at least one of: a frequency that the corresponding n-gram appeared in the transcriptions of the previous queries of the corpus of users; a frequency that the corresponding-gram appeared in a successful transcription of the previous queries of the corpus of users; or a frequency that the corresponding n-gram appeared in a corrected transcription.

When generating the biasing context vector, the biasing context model may be further configured to receive contextual features indicating at least one of a source that captured the current query, an application the current query was directed toward, or a time of the current query. In some configurations, the speech recognizer includes an end-to-end speech recognition model. The current query may be captured by a client device associated with the user. The data processing hardware may reside on the user device or a computing system in communication with the client device via a network.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a flowchart of an example arrangement of operations for a method of using voice query history to improve speech recognition.

Like reference symbols in the various drawings indicate like elements.

DETAILED DESCRIPTION

Figure 1:
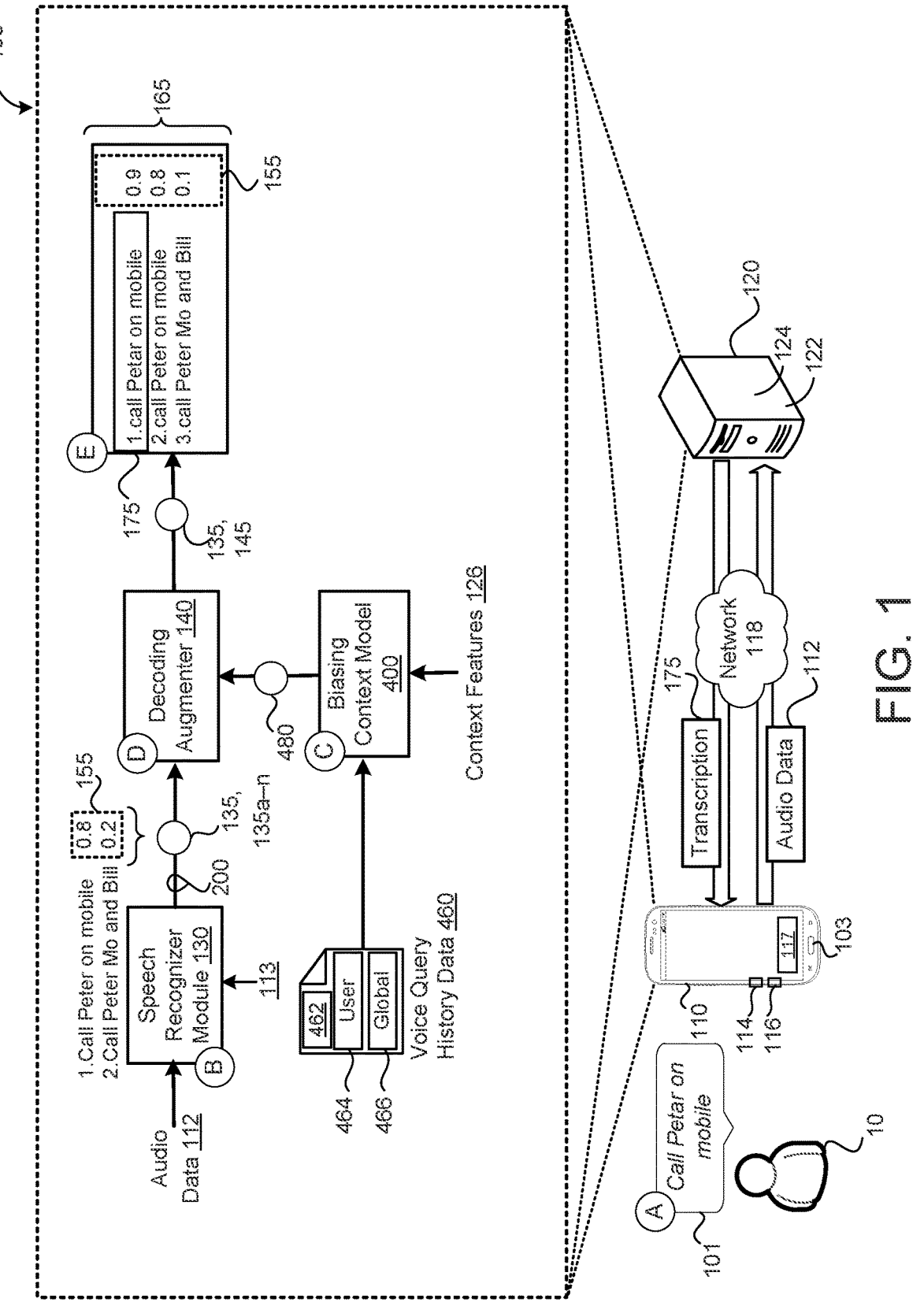
FIG. 1 is an example system for using a voice history-based biasing context model to bias speech recognition results for a current spoken query towards terms/phrases a user is likely to speak.

Automatic speech recognition (ASR) systems are becoming increasingly popular in client devices as the ASR systems continue to provide more accurate transcriptions of what users speak. Recently, end-to-end (E2E) ASR models have gained popularity in achieving state-of-the-art performance in accuracy and latency. In contrast to conventional hybrid ASR systems that include separate acoustic, pronunciation, and language models, E2E ASR models apply a sequence-to-sequence approach to jointly learn acoustic and language modeling in a single neural network that is trained end to end from training data, e.g., utterance-transcription pairs. Still, in some instances, ASR models generate inaccurate transcriptions that misrecognize what the user actually spoke. This is often the case when user speaks a unique phrase that is sparse in or non-existent in training data used to train the ASR model. As a result, a correct hypothesis for the unique phrase either has a low rank in a recognition lattice of possible speech recognition hypotheses or is missing entirely.

Existing techniques for improving recognition toward phrases a user is likely to speak is to rely on past typed history of the user for use in biasing speech recognition results toward terms found in the past typed history. Past typed history may include queries typed into a search engine linked to a profile of the user or terms/phrases that are unique to the user, such as, without limitation, names in a contact list and song/artist/album names in a playlist of the user. While prevalent and accessible, existing speech recognition models have been unable to use voice history data of past voice queries and resulting transcriptions for biasing speech recognition due to inherent issues posed by the potential feedback loop of audio/transcription pairs. Namely, when a spoken query is misrecognized and the paired audio and misrecognized transcriptions is stored in the voice history, use of this data for biasing would propagate future misrecognition of the same phrase when spoken in subsequent queries.

While user corrections of misrecognized transcriptions can be leveraged by speech recognition systems to generate more accurate transcriptions for subsequent utterances, these user corrections can also result in biasing the speech recognition systems toward phrases a user did not intend to convey. For instance, consider a spoken utterance of "call Petar" that an ASR system misrecognizes as "call Peter" where both Petar and Peter are names listed in the user's contact list. Despite the user correcting the transcription to convey the intended utterance of "call Petar", biasing the ASR system to produce the transcription "Petar" for every subsequent utterance spoken by the user that sounds similar to "Peter" and Petar" will result in the ASR model inaccurately transcribing any subsequent utterances where the user instead intended to convey "Peter". That is, just because the user intended to convey "Petar" previously does not mean the user will never intend to convey "Petar" at a later time. Moreover, if the user continues to convey "Petar" but the ASR system repeatedly generates the incorrect transcription "Peter," the user may lose trust in the ASR system. Accordingly, past voice history is difficult for the ASR system to leverage for generating accurate transcriptions since the ASR system must consider whether Peter and Petar are personal contacts, whether either Peter or Petar is a generic entity likely to be spoken in utterances, an acoustic fit to audio observations, and if other better speech recognition hypotheses are present in a lattice of possible speech recognition hypotheses.

Implementations herein are directed toward obtaining training samples and statistics associated with the training samples for use in training a biasing context model to learn how to generate a biasing context vector from voice query history data including a user's query history of n-grams, the biasing context vector indicating a likelihood that each n-gram from the query history of n-grams will be present in a current query spoken by the user. During decoding of a spoken query, an ASR model uses the biasing context vector to bias/augment the decoding of speech recognition hypotheses toward n-grams that are more likely to be conveyed in the spoken query.

The user's query history of n-grams may provide user statistics associated with the user that indicate a frequency that each n-gram was used by the user, a frequency that each n-gram appeared in a successful query from the query history, a frequency that each n-gram appeared in queries from the query history associated with corrected transcriptions or follow-up queries, and/or a features associated with each query from the query history that included the n-gram. Here, the features associated with each query from the query history may include a source (i.e., user device, such as a phone, smart speaker, etc.) that captured the query, an application (i.e., a digital assistant, a type of digital assistant, search engine, streaming music service, etc.) the query was directed toward, time of day of the query, and/or other features that may be relevant for biasing recognition of future queries. Moreover, the voice query history data may also include global statistics of n-grams extracted from query histories of a corpus of users. Here, global statistics of each n-gram extracted from the query histories of the corpus of users may indicate a frequency that the n-gram appeared in the query histories of the corpus of users, a frequency that each n-gram appeared in a successful query from the query histories of the corpus of users, and/or a frequency that each n-gram appeared in queries from the query histories associated with corrected transcriptions or follow-up queries.

The biasing context vector generated by the biasing context model may include strings of n-grams from the user's query history, and more particularly, string templates that give more weight to certain n-grams than other n-grams. As such, the biasing context vector provides a string of n-grams from the user's query history that are each scored to indicate the likelihood that the corresponding n-gram will appear in a current query spoken by the user.

FIG. 1 illustrates an example of a system 100 for automatic speech recognition (ASR) of an utterance 101 spoken by a user 10 using audio data 112 corresponding to the utterance (i.e., query) 101. The system 100 includes a client device 110 (interchangeably referred to as 'user device 110'), a computing system 120, and a network 118. The computing system 120 may be a distributed system (e.g., cloud computing environment) having scalable elastic resources. The resources include computing resources 122 (e.g., data processing hardware) and/or storage resources 124 (e.g., memory hardware). The network 118 can be wired, wireless, or a combination thereof, and may include private networks and/or public networks, such as the internet.

In some examples, the computing system 120 receives audio data 112 from the client device 110, and the computing system 120 processes the audio data 112 to generate a lattice 200 of multiple candidate hypotheses 135 for the utterance 101 based on the audio data 112. In some additional examples, the client device 110 processes the audio data 112 entirely on-device to generate the lattice 200 of multiple candidate hypotheses 135 for the utterance 101 based on the audio data 112. Here, each candidate hypothesis corresponds to a candidate transcription for the utterance 101 and is represented by a respective sequence of hypothesized terms forming n-grams.

As described in greater detail below, while generating the multiple candidate hypotheses 135, a decoding augmenter 140 (executing on the client device 110 or the computing system 120) associated with the speech recognizer module 130 augments the decoding graph 200 to output a ranked result 165 that includes rankings for the multiple candidate hypotheses 135 and any additional candidate hypotheses 145 for the utterance 101 that were either not included in the existing candidate hypotheses 135 or ranked very low among the existing candidate hypotheses 135 in the lattice 200. Based on the ranked result 165, the client device 110 (or the computing system 120) generates a transcription 175 for the utterance 101 by selecting a highest ranking hypothesis from the multiple existing candidate hypotheses 135 or the one or more additional candidate hypotheses 145 in the ranked result 165.

FIG. 1 shows operations (A) to (E) which illustrate a flow of data. As described herein, the computing system 120 performs operations (B) to (E). However, it is understood that the client device 110 may also perform operations (B) to (E) in addition to, or in lieu of, the computing system 120 performing the operations. In some examples, the client device 110 performs a first portion of the operations (e.g., operations (B) to (C)) and the computing system 120 performs a second portion of the operations (e.g., operations (D) to (E)), or vice-versa.

The client device 110 includes data processing hardware 114 and memory hardware 116. The client device 110 may include one or more audio capture devices (e.g., microphone(s)) 103 for capturing and converting utterances 101 from the user 10 into the audio data 112 (e.g., electrical signals). In some examples, the microphone 103 is separate from the client device 110 and in communication with the client device 110 to provide the recorded utterance 101 to the client device 110. The client device 110 can be any computing device capable of communicating with the computing system 120 through the network 118. In lieu of spoken utterances 101, the user 10 may input textual utterances 101 via a keyboard 117, such as a virtual keyboard displayed in a graphical user interface of the client device 110 or a physical keyboard in communication with the client device 110. The client device 110 includes, but is not limited to, desktop computing devices and mobile computing devices, such as laptops, tablets, smart phones, smart speakers/displays, smart appliances, vehicle infotainment systems, internet-of-things (IOT) devices, and wearable computing devices (e.g., headphones, headsets and/or watches).

In the example of FIG. 1, during stage (A), the user 10 speaks an utterance 101, and the microphone 103 of the client device 110 records the utterance 101. In this example, the utterance 101 includes the user 10 speaking "call Petar on mobile." The client device 110 transmits the audio data 112, corresponding to the utterance 101 recorded by the microphone 103, to the computing system 120 via the network 118. During stage (B), the computing system 120 processes the audio data 112 to generate multiple candidate hypotheses 135, 135*a-n*. Here, each candidate hypothesis 135 corresponds to a candidate transcription for the utterance 101 and is represented by a respective sequence of hypothesized terms. For example, the computing system 120 may execute the speech recognizer module 130 (e.g., an automated speech recognition (ASR) module) for producing a word lattice 200 (also referred to as a 'decoding graph') indicating the multiple candidate hypotheses transcriptions 135 that may be possible for the utterance 101 based on the audio data 112. The speech recognizer module 130 may evaluate potential paths through the word lattice 200 to determine the multiple candidate hypotheses 135.

Figure 2A:
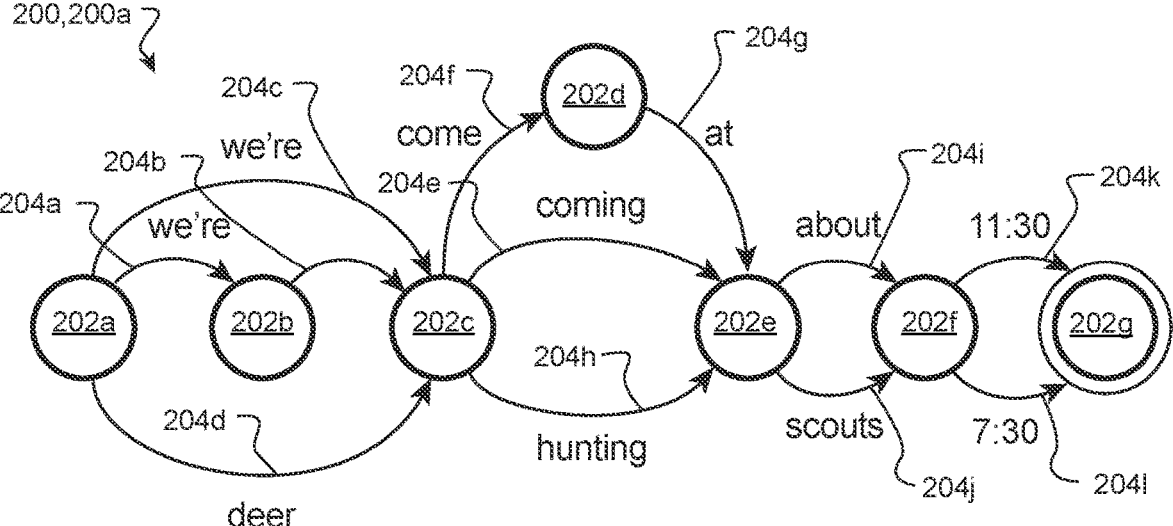
FIGS. 2A and 2B are schematic views of diagrams that illustrate examples of word lattices.

FIG. 2A is illustrates an example of a word lattice 200, 200*a* that may be provided by the speech recognizer module 130 of FIG. 1. The word lattice 200*a* represents multiple possible combinations of words that may form different candidate hypotheses 135 for an utterance 101.

The word lattice 200*a* includes one or more nodes 202*a-g* that correspond to the possible boundaries between words. The word lattice 200*a* includes multiple edges 204*a*-1 for the possible words in the candidate hypotheses that result from the word lattice 200*a*. In addition, each of the edges 204*a*-1 can have one or more weights or probabilities of that edge being the correct edge from the corresponding node. The weights are determined by the speech recognizer module 130 and can be based on, for example, a confidence in the match between the speech data and the word for that edge and how well the word fits grammatically and/or lexically with other words in the word lattice 200*a*.

For example, initially, the most probable path (e.g., most probable candidate hypothesis 135) through the word lattice 200*a* may include the edges 204*c*, 204*e*, 204*i*, 204*k*, which have the text "we're coming about 11:30." A second best path (e.g., second best candidate hypothesis 135) through the word lattice 200*a* may include the edges 204*d*, 204*h*, 204*j*, 204l, which have the text "deer hunting scouts 7:30."

Each pair of nodes may have one or more paths corresponding to the alternate words in the various candidate hypotheses 135. For example, the initial most probable path between the node pair beginning at node 202*a* and ending at the node 202*c* is the edge 204*c* "we're." This path has alternate paths that include the edges 204*a*, 204*b* "we are" and the edge 204*d* "deer."

Figure 2B:
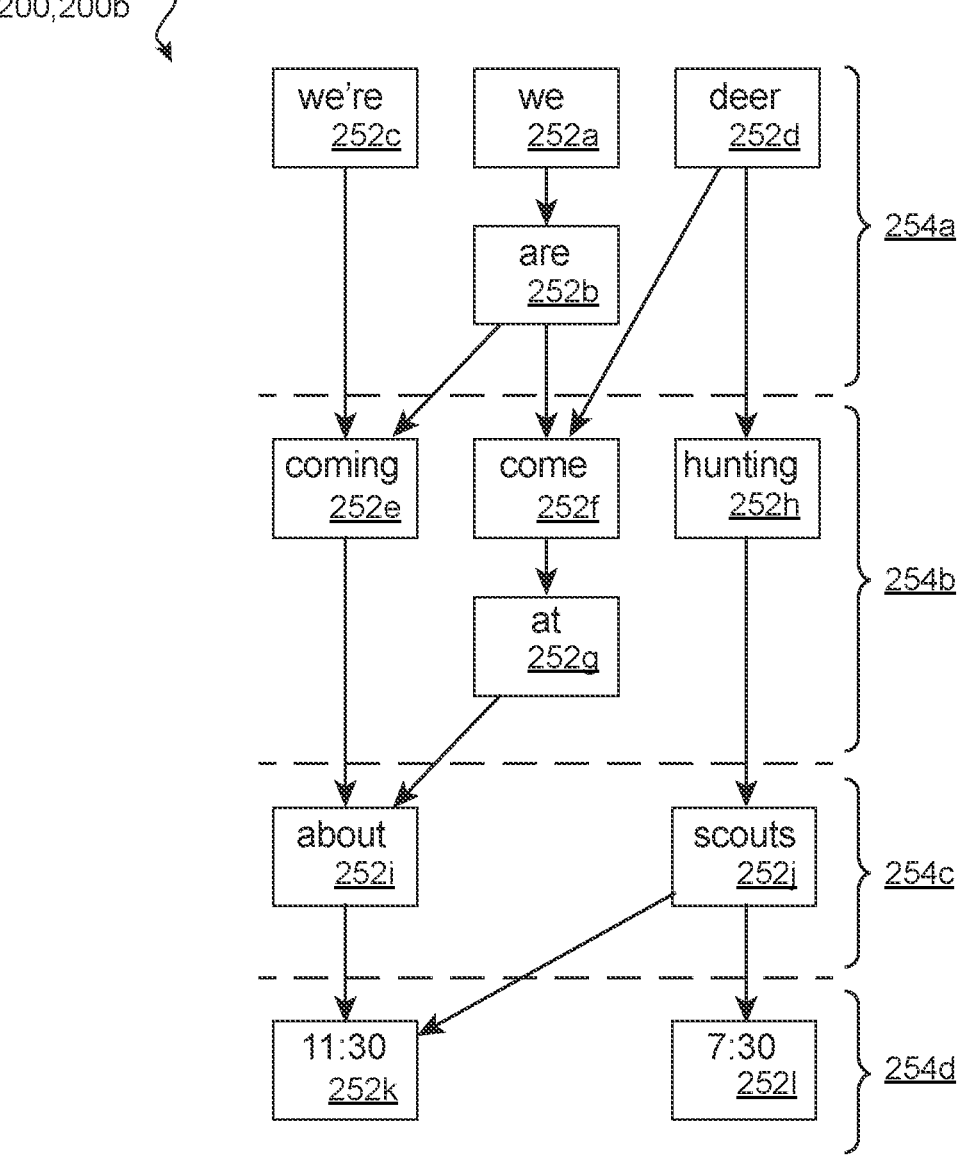

FIG. 2B is an example of a hierarchical word lattice 200, 200*b* that may be provided by the speech recognizer module 130 of FIG. 1. The word lattice 200*b* includes nodes 252*a*-1 that represent words that make up the various candidate hypotheses 135 for an utterance 101. The edges between the nodes 252*a*-1 show that the possible candidate hypotheses 135 include: (1) the nodes 252*c*, 252*e*, 252*i*, 252*k* "we're coming about 11:30"; (2) the nodes 252*a*, 252*b*, 252*e*, 252*i*, 252*k* "we are coming about 11:30"; (3) the nodes 252*a*, 252*f*, 252*g*, 252*i*, 252*k* "we are come at about 11:30"; (4) the nodes 252*d*, 252*f*, 252*g*, 252*i*, 252*k* "deer come at about 11:30"; (5) the nodes 252*d*, 252*h*, 252*j*, 252*k* "deer hunting scouts 11:30"; and (6) the nodes 252*d*, 252*h*, 252*j*, 252l"deer hunting scouts 7:30."

Again, the edges between the nodes 242*a*-1 may have associated weights or probabilities based on the confidence in the speech recognition (e.g., candidate hypothesis) and the grammatical/lexical analysis of the resulting text. In this example, "we're coming about 11:30" may currently be the best hypothesis and "deer hunting scouts 7:30" may be the next best hypothesis. One or more divisions, 354*a-d*, can be made in the word lattice 200*b* that group a word and its alternates together. For example, the division 254*a* includes the word "we're" and the alternates "we are" and "deer." The division 252*b* includes the word "coming" and the alternates "come at" and "hunting." The division 254*c* includes the word "about" and the alternate "scouts" and the division 254*d* includes the word "11:30" and the alternate "7:30."

Referring back to FIG. 1, the speech recognizer module 130 may generate the multiple candidate hypotheses 135 from the word lattice 200. That is, the speech recognizer module 130 generates likelihood scores 155 for each of the candidate hypotheses 135 of the word lattice 200. Each likelihood score 155 indicates a probability that the candidate hypotheses 135 is correct (e.g., matches the utterance 101). In some implementations, the speech recognizer module 130 includes an end-to-end (E2E) speech recognition model configured to receive audio data 112 and generate the word lattice 200. In particular, the E2E speech recognition model processes the audio data 112 to generate corresponding likelihood scores 155 for each of the multiple candidate hypotheses 135 from the word lattice 200. In some examples, the speech recognizer module 130 includes a separate acoustic model, language model, and/or pronunciation model.

During stage (B), the speech recognizer module 130 identifies a set of highest-ranking candidate hypotheses 135 from multiple candidate hypotheses 135 in the word lattice 200. For example, using likelihood scores 155 from the speech recognizer module 130, the client device 110 (or the computing system 120) selects n candidate hypotheses 135 with the highest likelihood scores 155, where n is an integer. In some instances, the client device 110 (or the computing system 120) selects candidate hypotheses 135 with likelihood scores 155 that satisfy a likelihood score threshold. Optionally, the speech recognizer module 130 may rank the set of highest-ranking candidate hypotheses 135 using the likelihood scores 155.

In the example shown, the speech recognizer module 130 generates candidate hypotheses 135 for the current query 101 "Call Petar on mobile" spoken by the user 10. In this example, the top two candidate transcriptions (e.g., the two that are most likely to be correct) are selected as the set of highest ranking candidate hypotheses 135. The highest ranking candidate hypotheses 135 include a first candidate hypothesis 135 "Call Peter on mobile" with a likelihood score 155 of 0.8 and a second candidate hypotheses 135 "Call Peter Mo and Bill" with a likelihood score 155 of 0.2. Here, a higher likelihood score 155 indicates a greater confidence that the candidate hypothesis 135 is correct. Notably, neither of the highest ranking candidate hypotheses 135 include the utterance 101 actually spoken by the user 10 (e.g., "call Petar on mobile"). Accordingly, if the computing system 120 selects either of the highest ranking candidate hypotheses 135, the transcription 175 output to the user 10 will be incorrect.

During Stage (C), a biasing context model 400 obtains voice query history data 460 associated with the user 10 and generates a biasing context vector 480 that indicates a likelihood that n-grams 462 from a user's query history of n-grams 462 will be present in the current query (i.e., utterance) 101 spoken by the user 10. The voice query history data 460 includes n-grams 462 extracted from transcriptions of previous queries spoken by the user 10. In some examples, n-grams 462 are extracted from transcriptions of only previous queries spoken by the user 10 within a threshold time before the current query (i.e., utterance) 101 spoken by the user 10. For instance, the n-grams 462 may only be extracted from previous queries spoken by the user 10 within the last N minutes/days before the current query 101.

The voice query history data 460 may additionally include n-grams 462 extracted from transcriptions of query histories of a corpus of users. The biasing context model 400 may weight n-grams 462 extracted from the user's query history of n-grams differently than the n-grams 462 extracted from the query histories of the corpus of users.

In the example shown, the voice query history data 460 provides user statistics 464 associated with the user 10 that spoke the current query 101 and global statistics 466 of the n-grams 462 extracted from the query histories of users from the corpus of users. Notably, while the example shows the biasing context model 400 obtaining and using both the user and global statistics 464, 466 for generating the biasing context vector 480, the biasing context model 400 may obtain and use only one of the user statistics 464 or the global statistics 466 for generating the biasing context vector 480.

For each n-gram 462 extracted from the user's query history, the user statistics 464 may indicate at least one of a frequency that the n-gram 462 appears in the user's query history, a frequency that the n-gram appeared in a successful query from the query history, a frequency that each n-gram appeared in queries from the query history associated with corrected transcriptions or follow-up queries, or other features associated with each query from the query history that included the n-gram 462. Here, the features associated with each query from the query history may include a source (i.e., user device, such as a phone, smart speaker, etc.) that captured the query, an application (i.e., a digital assistant, a type of digital assistant, search engine, streaming music service, etc.) the query was directed toward, time of day of the query, and/or other features that may be relevant for biasing recognition of future queries.

Similarly, for each n-gram 462 extracted from the query histories of the corpus of users, the global statistics 466 may indicate at least one of a frequency that the n-gram 462 appeared in the query histories of the corpus of users, a frequency that each n-gram 462 appeared in a successful query from the query histories of the corpus of users, and/or a frequency that each n-gram 462 appeared in queries from the query histories associated with corrected transcriptions or follow-up queries. Based on the user statistics 464 and the global statistics 466, the voice query history data 460 may further provide user-specificity statistics for use by the biasing context model 400 in generating the biasing context vector 480. The user-specificity statistics may indicate a frequency of n-grams appearing in both the user's query history of n-grams and the query histories of the corpus of users. In some examples, the user-specificity statistics include Term Frequency-Invest Documentary Features (TF-IDF) for unigrams appearing in both the user's query history of n-grams and the query histories of the corpus of users. Additionally or alternatively, the user-specificity statistics may include Pointwise Mutual Information (PMI) between the user and the n-grams.

In some implementations, the biasing context model 400 additionally receives contextual features 126 that may indicate a source (e.g., a type of the client device 110 such as a phone, smart speaker, etc.) that captured the current query, an application (i.e., a digital assistant, a type of digital assistant, search engine, streaming music service, etc.) the query 101 was directed toward, time of day of the current query 101, personalized data and/or in-domain data relevant to a current context when the user 10 spoke the current query 101. Here, the personalized and/or in-domain data relevant to the current context main include, without limitation, a list of the user's contacts, names of items in the user's media library, names of nearby locations, an application currently executing on the client device, and names of installed applications. The context features 126 may be stored on the memory hardware 114 of the client device 110 and/or on the memory hardware 124 of the computing system 120. The information in these different contextual data sets will change from time to time, such as when the user adds or deletes contacts, when the user's media library changes, when the user changes location, and so on. The biasing context model 400 can periodically request updates to the lists of data in order to refresh the contextual information it uses.

The biasing context vector 480 generated by the biasing context model 400 may include strings of the n-grams 462 extracted from the user's query history and/or the query histories of the corpus of users, and more particularly, string templates that give more weight to certain n-grams 462 than other n-grams. As such, the biasing context vector 480 may provide a string of n-grams 462 from the user's query history and/or the query histories of the corpus of users that are each scored to indicate the likelihood that the corresponding n-gram will appear in the current query 101 spoken by the user 10.

During stage (D), the decoding augmenter 140 (executing on the client device 110 or the computing system 120) associated with the speech recognizer module 130 uses the biasing context vector 480 to augment the lattice 200 of the multiple candidate hypotheses 135. Based on the biasing context vector 480 indicating the likelihood that each n-gram 462 from the voice query history data 460 will be present in the current query 101, the decoding augmenter 140 may generate one or more new candidate hypotheses 145 for the current query 101 that were either not included in the existing candidate hypotheses 135 or ranked very low among candidate hypotheses in the lattice 200 output by the speech recognizer module 130. In some examples, the lattice 200 of the multiple candidate hypotheses 135 are output by the speech recognizer module 130 during a first pass and the decoding augmenter 140 corresponds to a second pass language model that uses the biasing context vector 480 to re-score the existing hypotheses in the lattice 200 and/or generate one or more new candidate hypotheses 145 relevant to the weighting of n-grams 465 extracted from the voice query history data 460. Additionally or alternatively, the decoding augmenter 140 may boost the scores 155 of hypotheses in the lattice 140 that contain n-grams 462 (i.e., hypothesized terms) in the weighted strings of n-grams represented by the biasing context vector 480.

The decoding augmenter 140 may include an n-gram language model that uses the biasing context vector 480 and conditional probabilities to successively predict terms in a sequence of n-grams based on n or n–1 preceding terms and/or n or n+1 subsequent terms from a particular phrase. For instance, the language model may include increased conditional probabilities where the probability of the user 10 intending to convey a particular phrase increases as the number of n-grams increases. For example, a sequence with one n-gram is a unigram (e.g., one word), a sequence with two n-grams is a bigram (e.g., two words), and a sequence with three n-grams is a trigram (e.g., three words).

In other examples, the decoding augmenter 140 includes a second pass speech recognizer module that processes the audio data 120 with or without the results 135, 200 from the first pass to generate a new lattice of candidate hypotheses 145. In these examples, the speech recognizer module 130 may be a streaming speech recognition module that generates streaming transcriptions and the second pass speech recognizer module includes a more computationally intensive speech recognizer that may leverage the voice query history data 460 to conceivably produce more accurate descriptions, albeit at increased latency.

With continued reference to FIG. 1, decoding augmenter 140 generates likelihood scores 155 for the re-scored existing candidate hypotheses 135 and/or new candidate hypotheses 145 to provide a ranked result 165 that includes the rankings of the existing and/or new candidate hypotheses 135, 145 based on the likelihood scores 155. Continuing with the example, the decoding augmenter 140 scores the new candidate hypotheses 145 "call Petar on mobile" (or rescores "call Petar on mobile" that was ranked low in the lattice 200 of existing candidate hypotheses 135), thereby resulting in the ranked result 165 including the new candidate hypotheses 145 "call Petar on mobile" with a likelihood score 155 of 0.9 as the highest ranking candidate hypothesis.

During stage (E), the client device 110 (or computing system 120) is configured to generate a transcription 175 of the current query 101 spoken by the user 10 by selecting the highest ranking candidate in the ranked result 165. In the example shown, the new candidate hypothesis 145 "call Petar on mobile" is selected as the correct transcription 175 because it has the highest likelihood score 155 of 0.9. When the computing system 120 selects/generates the transcription 175, the computing system 120 may transmit the transcription 175, via the network 118, to the client device 110 to provide the transcription 175 to the user 10.

While the above examples depicts using voice query history data 460 to bias a current query 101 corresponding to an audio-based speech input, aspects of the present disclosure are equally applicable to using the biasing context vector 480 generated for the voice query history data 460 to bias/score candidate hypotheses for non-speech inputs. For instance, a non-speech input 113 may include a user input indication indicating selection of one or more characters of the keyboard 117 (e.g., virtual or physical keyboard) in communication with the data processing hardware 114 of the client device 110. In this example, the speech recognizer module 130 may be replaced by a keyboard detection module configured to generate a lattice 200 of candidate hypotheses 135 for the non-speech input 113. The biasing context model 400 may similarly generate the biasing context vector based on the voice query history data 460 and optional context features 126, while the decoding augmenter 140 may function similarly to the examples above by generating a new candidate hypotheses for the non-speech input 113 that may be inserted into the lattice 200. As such, the decoding augmenter 140 may score the new candidate hypothesis relative to the existing candidate hypotheses, thereby providing the ability to rank non-speech recognition hypotheses that include n-grams 462 which may be more likely to be input by the user.

Figure 3A:
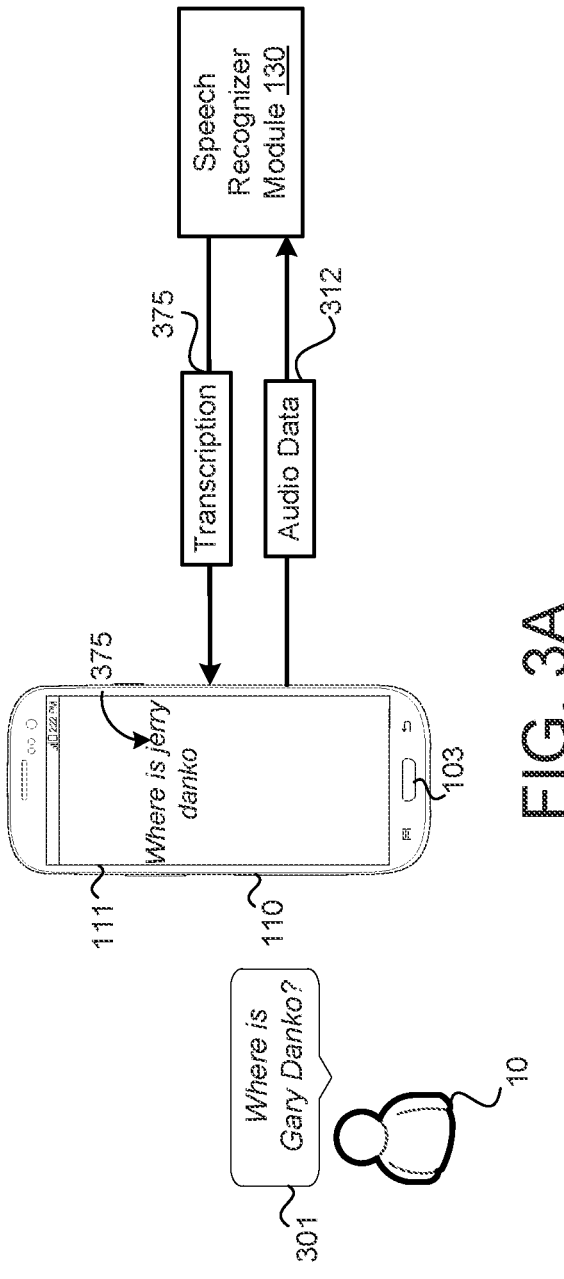
FIGS. 3A-3C are schematic views of a user providing an input indication to correct a misrecognized previous transcription.
Figure 3C:
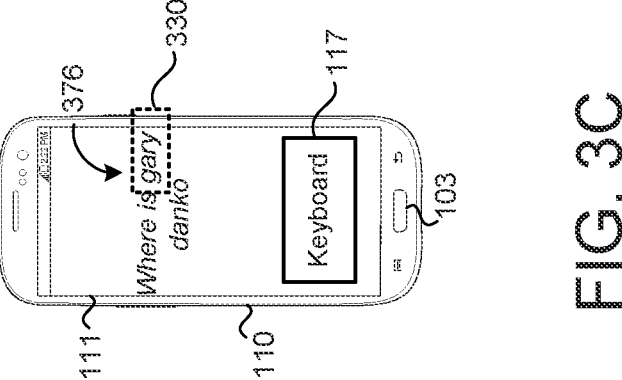
Figure 3B:
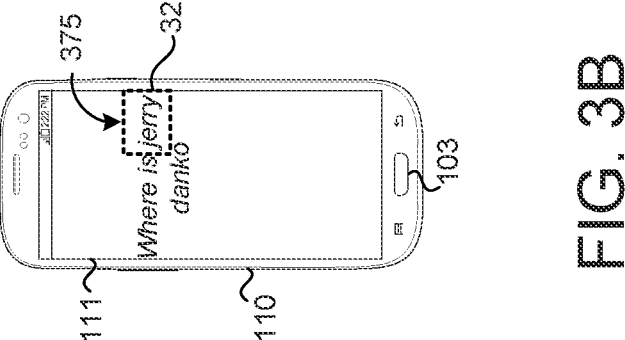

FIGS. 3A-3C illustrate correcting a misrecognized transcription and storing a corrected transcription in a user's query history of n-grams. In some implementations, the speech recognizer module 130 generates a misrecognized transcription 375 that misrecognizes a previous query 301 spoken by the user 10. As used herein, the previous query 301 and the misrecognized transcription 375 are received at the client device 110 at a prior time to receiving the transcription 175 and the query 101 (FIG. 1). As will become apparent, the misrecognized transcription 375 can be stored in the user's query history of n-grams 462 and used by the biasing context model 400 in conjunction with other voice query history data 460 (FIG. 1) to generate the biasing context vector 480 for improving speech recognition accuracy when the client device 110 receives the query 101 (FIG. 1) at a later time.

FIG. 3A illustrates the microphone 103 of the client device 110 recording the user 10 speaking a previous query 301 "Where is Gary Danko." The client device 110 converts the previous query 301 to audio data 312 and provides audio data 312 to the speech recognizer module 130. The speech recognizer module 130 processes the audio data 312 to generate the misrecognized transcription 375 corresponding to the audio data 312. In the example shown, the speech recognizer module 130 generates the misrecognized transcription 375 "Where is Jerry Danko" which is a misrecognition of the previous query 301 spoken by the user 10. The client device 110 displays the previous transcription 375 to the user 10 via a graphical user interface (GUI) 111.

Referring now to FIG. 3B, the user 10 may identify that the misrecognized transcription 375 displayed on the GUI 111 does not match the previous query 301. As such, the user 10 provides an input indication to the GUI 111 of the client device 110 that indicates a selection of a misrecognized phrase 325 in the misrecognized transcription 475. In some examples, the input indication includes the user 10 providing a touch input to the GUI 111 that selects the misrecognized phrase 325 from the misrecognized transcription 375. The misrecognized phrase 325 may include the entire misrecognized transcription 375 or a portion thereof. In the example shown, the misrecognized phrase 325 "jerry" only includes an incorrect portion of the previous transcription 375.

FIG. 3C illustrates the user 10 replacing the misrecognized phrase 325 in the misrecognized transcription 375 with a corrected phrase 330. In some examples, the user 10 inputs text to provide the corrected phrase 330 using a keyboard 117 of the client device 110. Optionally, the keyboard 117 may display responsive to the client device 110 receiving the input indication from the user 10 (FIG. 3B). In these examples, the user 10 may type in the corrected phrase (e.g., "gary") using the keyboard 117 of the client device 110. In other examples, the user 10 inputs the corrected phrase 330 by speaking to the client device 110. That is, the user 10 may speak each letter of the corrected phrase 330 (e.g., "G-A-R-Y"). After receiving the corrected phrase 330, the client device 110 replaces the misrecognized phrase 325 with the corrected phrase 330 to generate a corrected previous transcription 376 that represents an accurate transcription of the previous query 301.

Figure 4:
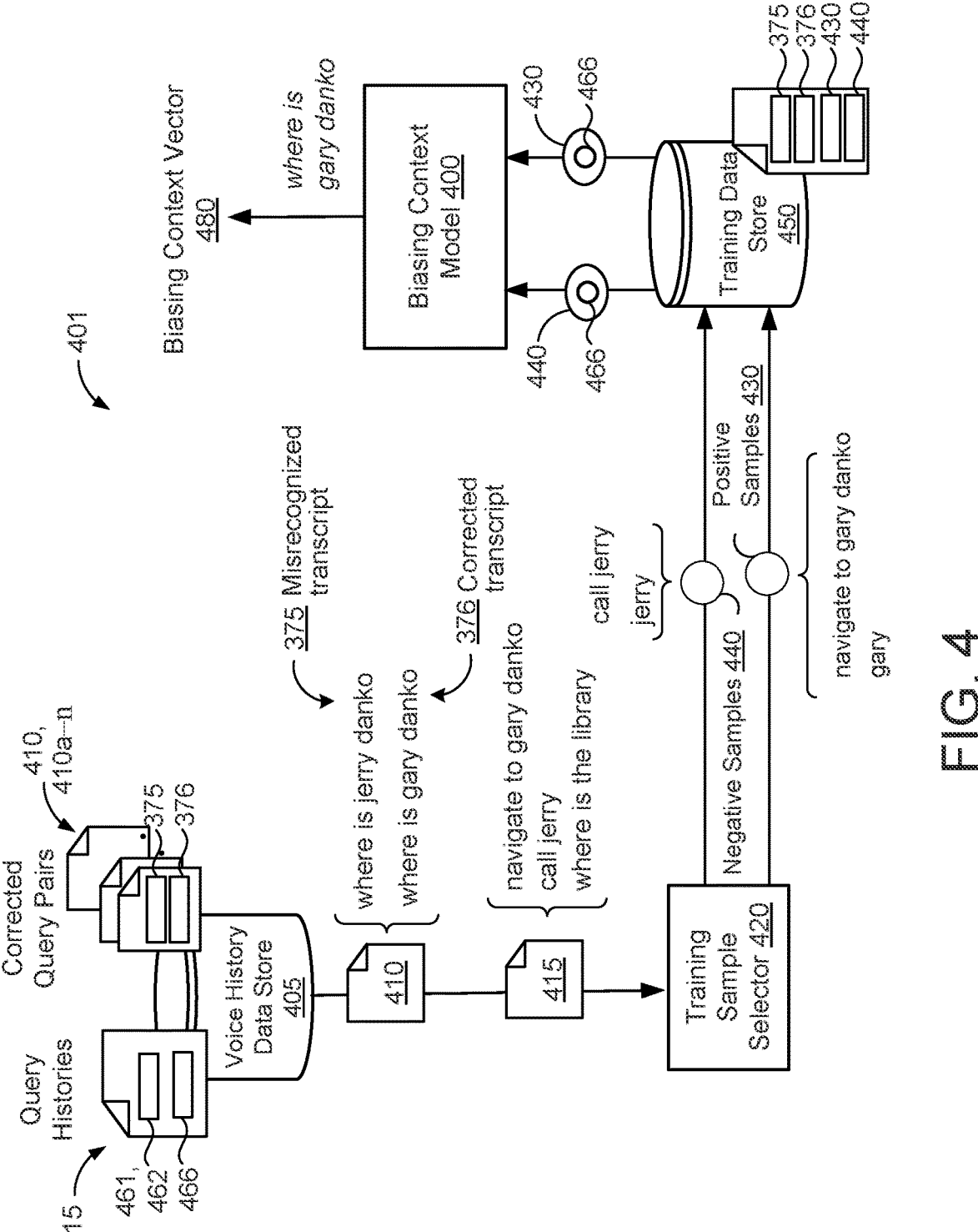
FIG. 4 is a schematic view of a training process for training the biasing context model of FIG. 1.

Accordingly, the user device 110 and/or the computing system 120 may store (i.e., at the memory hardware 116 of the client device 110 and/or the memory hardware 124 of the computing system 120) the misrecognized transcription 375, the misrecognized phrase 325, the corrected transcription 376, and/or the corrected phrase 330 in the user's query history of n-grams 462 in a voice history data store 405. The misrecognized transcription 375 and the corrected transcription 376 may form a corrected query pair 410 (FIG. 4). As will become apparent with reference to FIG. 4, the computing system 120 may use the corrected query pair 410 and query histories 415 from a corpus of users for training the biasing context model 400.

Referring to FIG. 4, in some implementations, a training process 401 trains the biasing context model 400 using query histories 415 from a corpus of users and corrected query pairs 410, 410*a-n*. The query histories 415 may include previous queries 461 and n-grams 462 contained in each previous query 461. Each previous query 461 may correspond to a transcription of a previous query spoken by one of the users in the corpus of users. The query histories 415 may include details such as whether a previous query 461 is correct or misrecognized, whether the previous query 461 was a follow-up query, and/or any of the aforementioned context features 126 described above with reference to FIG. 1 that may be associated with the previous query 461. The query histories 415 may compile the global statistics 466 of the n-grams 462 contained in the previous queries 461. As previously described with reference to FIG. 1, for each n-gram 462 extracted from the query histories 415 of the corpus of users, the global statistics 466 may indicate at least one of a frequency that the n-gram 462 appeared in the query histories of the corpus of users, a frequency that each n-gram 462 appeared in a successful query from the query histories of the corpus of users, and/or a frequency that each n-gram 462 appeared in queries from the query histories associated with corrected transcriptions or follow-up queries. The global statistics 466 may further include other features associated with each previous query 461 that may include a source (i.e., user device, such as a phone, smart speaker, etc.) that captured the previous query, an application (i.e., a digital assistant, a type of digital assistant, search engine, streaming music service, etc.) the previous query was directed toward, time of day of the previous query, and/or other features that may be relevant for biasing recognition of future queries.

Each corrected query pair 410 may include a misrecognized transcription 375 of a previous query paired with a corrected transcription 376 of the previous query. The corrected query pairs 410 may be extracted from the query histories 415 of the corpus of users. In some examples, correct transcriptions 376 not paired with any misrecognized transcriptions for given previous queries are used in addition to, or in lieu, of corrected query pairs 410. In these examples, the correct transcriptions 376 may be labeled/annotated as queries that were correctly recognized. These correct transcriptions 376 could be paired with incorrect transcriptions that were in a lattice of possible candidate transcriptions together with the correct transcription 376 but ranked lower. For instance, the correct transcriptions 376 may be labeled/annotated as correct in the query histories 415 when no user correction was made to the transcription and/or no immediate follow-up query serving as a correction to the transcription 376 was made.

For each corrected query pair 410 (or individual unpaired correct transcription 376), a training sample selector 420 selects, from the query histories 415 of the corpus of users, previous queries 461 and/or corresponding n-grams 462 contained in previous queries 461 for inclusion in positive samples 430 for training the biasing context model 400 to learn how to generate a biasing context vector 480 for the correct transcription 376. Continuing with the example, for the corrected query pair 410 including the misrecognized transcript 375 "where is jerry danko" paired with the correct transcript 376 "where is gary danko", the training sample selector 420 may select a set of previous queries 461 as positive samples 430 for training the biasing context model

400. Here, for each corresponding candidate previous query 461 from the query histories 415, the training sample selector 420 may determine whether biasing toward the corresponding candidate previous query 461 increases a probability of the correct transcription 376 (e.g., "where is gary danko") relative to incorrect ones. Thereafter, the training sample selector 420 may select those candidate previous queries 461 from the query histories that the training sample selector 420 determines to increase the probability of recognizing the correct transcription 376 as positive samples 430. For instance, the training sample selector 420 may select the candidate previous query 461 "navigate to gary danko" for inclusion as a positive sample 430. Notably, each previous query 461 selected for inclusion in the positive samples 430 may be weighted differently than the other previous queries 461 in the positive samples 430.

In addition to or in lieu of the previous queries 461, the trainings sample selector 420 may select only the n-grams 462 contained in the previous queries 461 that increase the probability of the correct transcription 376 relative to incorrect ones. For instance, the trainings sample selector 420 may select the n-gram 462 "gary" for inclusion as a positive sample 430. Notably, the previous queries 461 and/or n-grams 462 selected for inclusion in positive samples 430 may be weighted differently.

Additionally or alternatively, for each corrected query pair 410 (or individual unpaired correct transcription 376), the training sample selector 420 may select, from the query histories 415 of the corpus of users, previous queries 461 and/or corresponding n-grams 462 contained in the previous queries 461 for inclusion in negative samples 440 for training the biasing context model 400 to learn how to generate a biasing context vector 480 for the correct transcription 376. That is, the training sample selector 420 may select a set of previous queries 461 as negative samples 440 for training the biasing context model 400. Here, for each corresponding candidate previous query 461 from the query histories 415, the training sample selector 420 may determine whether biasing toward the corresponding candidate previous query 461 increases a probability of the misrecognized transcription 375 (e.g., "where is jerry danko") relative to the correct transcription 376 (e.g., "where is gary danko), or otherwise decreases the probability of the correct transcription 376. As a result, the training sample selector 420 may select those candidate previous queries 461 from the query histories that the training sample selector 420 determines to decrease the probability of recognizing the correct transcription 376 as negative samples 440. For instance, the training sample selector 420 may select the candidate previous query 461 "call jerry" for inclusion as a negative sample 440. Notably, each previous query 461 selected for inclusion in the negative samples 430 may be weighted differently than the other previous queries 461 in the negatives samples 430.

In addition to or in lieu of the previous queries 461, the trainings sample selector 420 may select only the n-grams 462 contained in the previous queries 461 that decrease the probability of the correct transcription 376 relative to incorrect ones, or otherwise increase the probability of the misrecognized transcription 375. For instance, the trainings sample selector 420 may select the n-gram 462 "jerry" for inclusion as a negative sample 430.

Notably, the training sample selector 420 determines the previous query 462 pertaining to "where is the library" does not have any effect on biasing toward either the correct transcription 376 or the misrecognized transcription 375, and is therefore, discarded from use as a training sample for training the biasing context model 400 to learn how to generate the biasing context vector 480 for the correct transcription 376. In some examples, the training sample selector 420 includes an n-gram language model that uses conditional probabilities to successively predict terms in a sequence of n-grams based on n or n−1 preceding terms and/or n or n+1 subsequent terms from a particular phrase.

A training data store 450 (i.e., residing on the memory hardware 124 of the computing device 120) stores the positive samples 430 and/or the negative samples 440 selected by the training sample selector 420 from the query histories 415 for each corresponding corrected query pair 410. As aforementioned, the positive and negative samples 430, 440 may each include a respective set of one or more previous queries 461 and/or n-grams 462 contained in the previous queries 461 that influence biasing recognition of the correct transcription 375. As such, for each query 461 and/or n-gram 462 in the positive and/or negative samples 430, 440, the corresponding corrected query pair 410 may include the global statistics 466 associated therewith. In some implementations, the training process 401 further refines the positive and negative samples 430, 440 by grouping the n-grams 462 selected for each corresponding corrected query pair 410 to provide pairwise comparison or ranking of the n-grams 462.

Thereafter, the training process 401 trains the biasing context model 400 on the positive samples 430 and/or the negative samples 440 selected from the query histories 415 for the corrected query pairs 410 to teach the biasing context model 400 to learn how to generate biasing context vectors 480. The biasing context model 400 may include a standard classification model that predicts a pairwise comparison/ranking model. In some implementations, the biasing context model 400 includes a linear regression model that predicts numerical features to represent the biasing context vector 480. In yet other implementations, the biasing context model 400 includes a gradient boosted decision tree. The biasing context model 400 may also include a deep neural network trained on text.

FIG. 5 provides a flowchart of an example arrangement of operations for a method 500 of improving speech recognition based on voice query history data. The operations may be performed by data processing hardware 610 (e.g., the data processing hardware 112 of the client device 110 or the data processing hardware 122 of the computing system) based on executing instructions stored on memory hardware 620 (FIG. 6) (e.g., the memory hardware 114 of the client device 110 or the memory hardware 124 of the computing system 120). At operation 502, the method 500 includes receiving audio data 112 corresponding to a current query 101 spoken by a user 10 and processing the audio data 112 to generate a lattice 200 of candidate hypotheses. Each candidate hypothesis corresponds to a candidate transcription for the current query and is represented by a respective sequence of hypothesized terms.

At operation 504, the method 500 also includes obtaining voice query history data 160 associated with the user 10. The voice query history data 460 includes n-grams 462 extracted from transcriptions of previous queries 461 spoken by the user 10. At operation 506, the method 500 includes generating, using a biasing context model 400 configured to receive the voice query history data 460, a biasing context vector 480. The biasing context vector 480 indicates a likelihood that each n-gram from the n-grams extracted from the transcriptions of the previous queries 461 spoken by the user 10 will appear in the current query 101.

At operation 506, the method includes augmenting the lattice 200 of candidate hypotheses 135, 145 based on the biasing context vector 480. At operation 508, the method 500 includes determining a transcription 175 for the current query 101 based on the augmented lattice of candidate hypotheses 135, 145.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
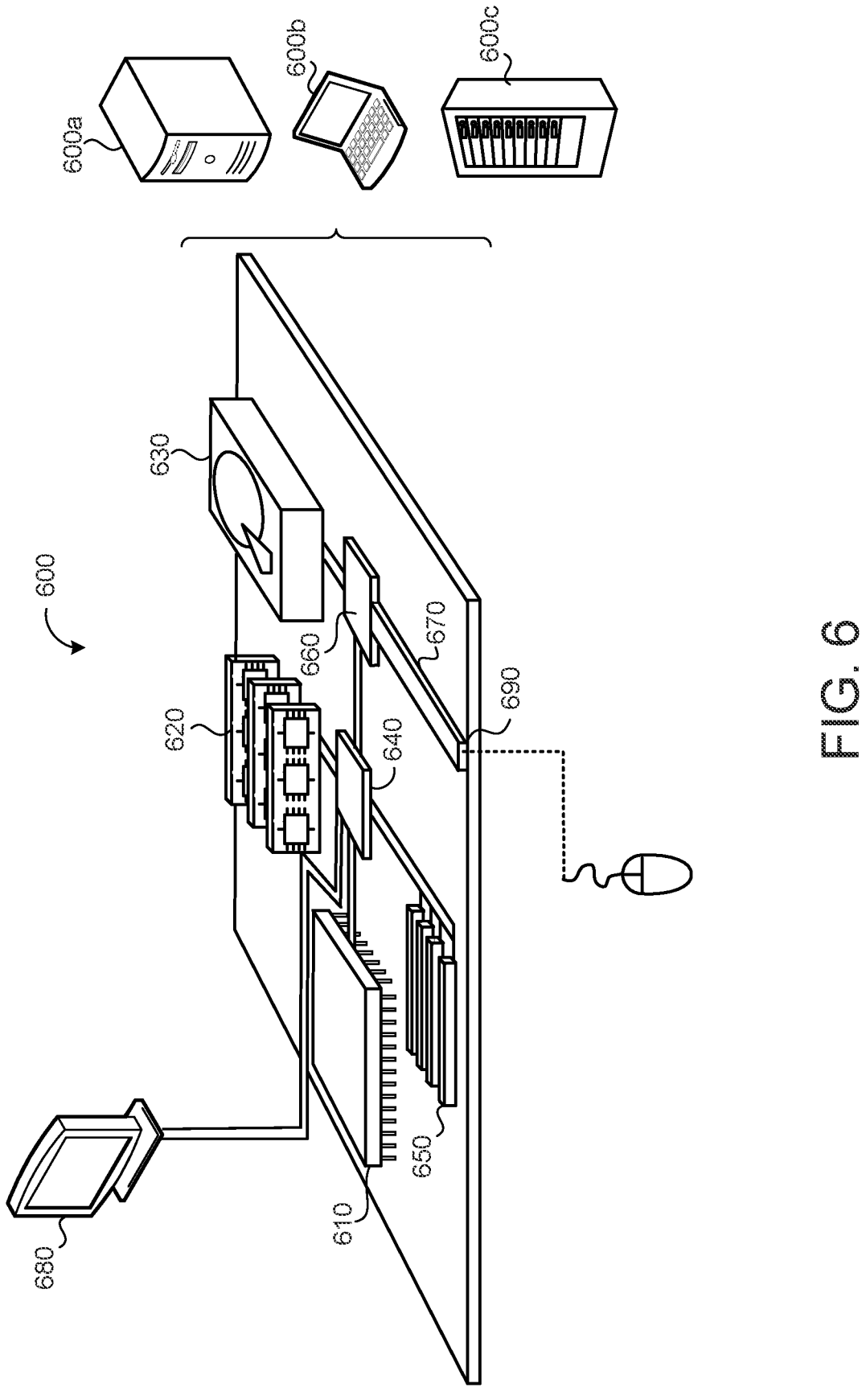
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving audio data corresponding to a current query spoken by a user;

processing, using a speech recognizer, the audio data to generate a lattice of candidate hypotheses, each candidate hypothesis corresponding to a candidate transcription for the current query and represented by a respective sequence of hypothesized terms;

obtaining voice query history data associated with the user, the voice query history data comprising n-grams extracted from transcriptions of previous queries spoken by the user;

generating, using a biasing context model configured to receive the voice query history data, a biasing context vector, the biasing context vector indicating a likelihood that each n-gram from the n-grams extracted from the transcriptions of the previous queries spoken by the user will appear in the current query;

based on the biasing context vector:

generating one or more new candidate hypotheses for the current query; and augmenting the lattice of candidate hypotheses and the one or more new candidate hypotheses; and determining a transcription for the current query based on the augmented lattice of candidate hypotheses and the one or more new candidate hypotheses.

2. The computer-implemented method of claim 1, wherein:

augmenting the lattice of candidate hypotheses and the one or more new candidate hypotheses comprises determining, using the biasing context vector, corresponding likelihood scores for the candidate hypotheses and the one or more new candidate hypotheses; and determining the transcription for the current query comprises:

ranking the candidate hypotheses and the one or more new candidate hypotheses based on the corresponding likelihood scores determined for the candidate hypotheses and the one or more new candidate hypotheses; and selecting the highest ranking one of the candidate hypotheses and the one or more new candidate hypotheses as the transcription of the current query.

3. The computer-implemented method of claim 1, wherein the n-grams of the voice query history data comprise n-grams extracted from only previous queries spoken by the user within a threshold time before the current query.

4. The computer-implemented method of claim 1, wherein the voice query history data includes user statistics for each corresponding n-gram among the n-grams extracted from the transcriptions of the previous queries spoken by the user associated with the user that spoke the current query, the user statistics for each corresponding n-gram indicating at least one of:

a frequency that the corresponding n-gram appears in transcriptions of the previous queries spoken by the user;

a frequency that the corresponding n-gram appeared in a successful transcription of the previous queries spoken by the user; or a frequency that the corresponding n-gram appeared in a corrected transcription.

5. The computer-implemented method of claim 4, wherein the user statistics for each corresponding n-gram further comprise one or more features associated with the transcription of the previous query that included the corresponding n-gram, the one or more features comprising:

a source that captured the previous query;

an application the previous query was directed toward; or a time when the previous query was spoken by the user.

6. The computer-implemented method of claim 1, wherein the voice query history data further comprises n-grams extracted from transcriptions of query histories of a corpus of users.

7. The computer-implemented method of claim 6, wherein the voice query history data includes global statistics for each corresponding n-gram among the n-grams extracted from the transcriptions of the query histories of the corpus of users, the global statistics for each corresponding n-gram indicating at least one of:

a frequency that the corresponding n-gram appeared in the transcriptions of the previous queries of the corpus of users;

a frequency that the corresponding-gram appeared in a successful transcription of the previous queries of the corpus of users; or a frequency that the corresponding n-gram appeared in a corrected transcription.

8. The computer-implemented method of claim 1, wherein, when generating the biasing context vector, the biasing context model is further configured to receive contextual features indicating at least one of:

a source that captured the current query;

an application the current query was directed toward; or a time of the current query.

9. The computer-implemented method of claim 1, wherein the speech recognizer comprises an end-to-end speech recognition model.

10. The computer-implemented method of claim 1, wherein:

the current query spoken by the user is captured by a client device associated with the user; and the data processing hardware resides on the client device or a computing system in communication with the client device via a network.

11. A system comprising:

data processing hardware; and memory hardware in communication with the data processing hardware, the memory hardware storing instructions that when executed on the data processing hardware cause the data processing hardware to perform operations comprising:

receiving audio data corresponding to a current query spoken by a user;

processing, using a speech recognizer, the audio data to generate a lattice of candidate hypotheses, each candidate hypothesis corresponding to a candidate transcription for the current query and represented by a respective sequence of hypothesized terms;

obtaining voice query history data associated with the user, the voice query history data comprising n-grams extracted from transcriptions of previous queries spoken by the user;

generating, using a biasing context model configured to receive the voice query history data, a biasing context vector, the biasing context vector indicating a likelihood that each n-gram from the n-grams extracted from the transcriptions of the previous queries spoken by the user will appear in the current query;

based on the biasing context vector:

generating one or more new candidate hypotheses for the current query; and augmenting the lattice of candidate hypotheses and the one or more new candidate hypotheses; and determining a transcription for the current query based on the augmented lattice of candidate hypotheses and the one or more new candidate hypotheses.

12. The system of claim 11, wherein:

augmenting the lattice of candidate hypotheses and the one or more new candidate hypotheses comprises determining, using the biasing context vector, corresponding likelihood scores for the candidate hypotheses and the one or more new candidate hypotheses; and determining the transcription for the current query comprises:

ranking the candidate hypotheses and the one or more new candidate hypotheses based on the corresponding likelihood scores determined for the candidate hypotheses and the one or more new candidate hypotheses; and selecting the highest ranking one of the candidate hypotheses and the one or more new candidate hypotheses as the transcription of the current query.

13. The system of claim 11, wherein the n-grams of the voice query history data comprise n-grams extracted from only previous queries spoken by the user within a threshold time before the current query.

14. The system of claim 11, wherein the voice query history data includes user statistics for each corresponding n-gram among the n-grams extracted from the transcriptions of the previous queries spoken by the user associated with the user that spoke the current query, the user statistics for each corresponding n-gram indicating at least one of:

a frequency that the corresponding n-gram appears in transcriptions of the previous queries spoken by the user;

a frequency that the corresponding n-gram appeared in a successful transcription of the previous queries spoken by the user; or a frequency that the corresponding n-gram appeared in a corrected transcription.

15. The system of claim 14, wherein the user statistics for each corresponding n-gram further comprise one or more features associated with the transcription of the previous query that included the corresponding n-gram, the one or more features comprising:

a source that captured the previous query;

an application the previous query was directed toward; or a time when the previous query was spoken by the user.

16. The system of claim 11, wherein the voice query history data further comprises n-grams extracted from transcriptions of query histories of a corpus of users.

17. The system of claim 16, wherein the voice query history data includes global statistics for each corresponding n-gram among the n-grams extracted from the transcriptions of the query histories of the corpus of users, the global statistics for each corresponding n-gram indicating at least one of:

a frequency that the corresponding n-gram appeared in the transcriptions of the previous queries of the corpus of users;

a frequency that the corresponding-gram appeared in a successful transcription of the previous queries of the corpus of users; or a frequency that the corresponding n-gram appeared in a corrected transcription.

18. System of claim 11, wherein, when generating the biasing context vector, the biasing context model is further configured to receive contextual features indicating at least one of:

a source that captured the current query;

an application the current query was directed toward; or a time of the current query.

19. The system of claim 11, wherein the speech recognizer comprises an end-to-end speech recognition model.

20. The system of claim 11, wherein:

the current query spoken by the user is captured by a client device associated with the user; and the data processing hardware resides on the client device or a computing system in communication with the client device via a network.

* * * * *